(No Model.)

O. PAQUETTE.
NUT.

No. 561,913.   Patented June 9, 1896.

Witnesses.
Fred L. Greenleaf.
Edward F. Allen.

Inventor.
Octave Paquette.
by Crosby & Gregory.
attys.

UNITED STATES PATENT OFFICE.

OCTAVE PAQUETTE, OF WHITEFIELD, NEW HAMPSHIRE, ASSIGNOR OF ONE-HALF TO ALEXANDER F. STOUGHTON, PETER T. STOUGHTON, AND JAMES C. STOUGHTON, OF SAME PLACE.

NUT.

SPECIFICATION forming part of Letters Patent No. 561,913, dated June 9, 1896.

Application filed February 27, 1896. Serial No. 581,060. (No model.)

*To all whom it may concern:*

Be it known that I, OCTAVE PAQUETTE, of Whitefield, county of Coos, State of New Hampshire, have invented an Improvement in Nuts, of which the following description, in connection with the accompanying drawings, is a specification, like letters on the drawings representing like parts.

My invention relates to nuts, and has for its object the provision of a nut, adapted for all ordinary uses, which will cut its own thread, if necessary, and clear out the threads if placed on a bolt whose threads are mutilated, clogged, stripped, or otherwise injured.

My improved nut also acts as a lock-nut, and possesses other advantages, as will appear in the following detailed description.

Figure 1:
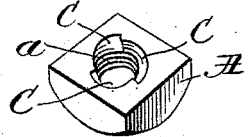
Figure 2:
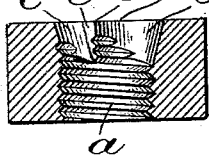
Figure 3:
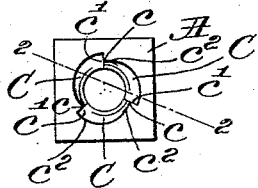

In the drawings, Figure 1 is a perspective view of my improved nut. Fig. 2 is a central vertical section thereof, on an enlarged scale, taken on line 2 2 of Fig. 3; and Fig. 3 is a plan view thereof.

Referring to the drawings, A designates a nut, which may be of any usual size or shape, provided internally with any variety of threads $a$. At their rear or inner portion the threads $a$ are cut away longitudinally of the bore of the nut, so as to provide a plurality of thread-cutting points or edges where the corners of the threads remain adjacent the cuts.

In the present embodiment of my invention I have shown three series of cutters or cutting edges $c$, which are preferably disposed slightly flaring from each other or in conical arrangement. These cutting edges may be provided in various ways, but I prefer to form them by cutting away the adjacent metal in a substantially radial line, as indicated at $c'$, the clearance-pocket C formed thereby being curved around at $c^2$ to meet the cutting-surface of the next series of cutters $c$. The clearance-pockets C are preferably flared or beveled outwardly considerably, so as to prevent all tendency of the chips and shavings grooved out from the bolt by the cutters from working into the nut and clogging the free movement of the same.

As my improved nut is turned forward on a bolt or stud the successive cutters cut into the material with increasing depth, the shavings being ejected by the flaring open-mouthed pockets C. As the nut cuts its way farther onto the bolt the threads of the latter are thereby tightly and accurately fitted to the threads of the nut, so as to render it certain that the nut cannot loosen and jar off, the nut thus locking itself in place.

In work where bolts are driven into place frequently the threads are jammed or stripped in driving, and in such cases my invention is particularly valuable. The nut will cut out the old and mutilated threads and renew the life of the bolt, thus adjusting itself where it would be impossible to put on the ordinary nut. Also, in instances where the bolt-threads are not cut or threaded far enough toward the head to enable the usual nut to be tightened against the material being bolted, the present invention enables the nut to cut down on the bolt the required distance, at the same time setting or locking itself firmly in place.

While I have shown my invention as having three cutters, I do not desire to be limited to that number, inasmuch as any number of cutters desired may be employed. Many other changes may be made within the spirit and scope of my invention.

The cutting end of the nut will be highly tempered or the entire nut case-hardened or otherwise made fit for cutting the material it is designed to be used on.

What I claim is—

1. A nut provided with continuous threads, and having one or more cutters formed in said threads and to cut a path for said threads, substantially as described.

2. A nut provided with continuous threads at one end, and having near its other end a plurality of cutting edges, arranged to flare slightly outward toward the rear of the nut, to successively cut a path for said threads, substantially as described.

3. A nut provided with ordinary threads, and having a plurality of cutting edges, to cut out a path for said threads, pockets being formed circumferentially between successive cutting edges, to remove the said cuttings, substantially as described.

4. A nut provided with ordinary threads, and having a plurality of cutting edges, adapted to cut into the material on which the nut is turned, flaring pockets being formed circumferentially between successive cutting edges, to automatically remove the debris of said cutting, substantially as described.

In testimony whereof I have signed my name to this specification in the presence of two subscribing witnesses.

OCTAVE $\overset{\text{his}}{\underset{\text{mark}}{\times}}$ PAQUETTE.

Witnesses:
ROYAL F. FASSETT,
JAMES HARTWELL.